UNITED STATES PATENT OFFICE 2,118,546

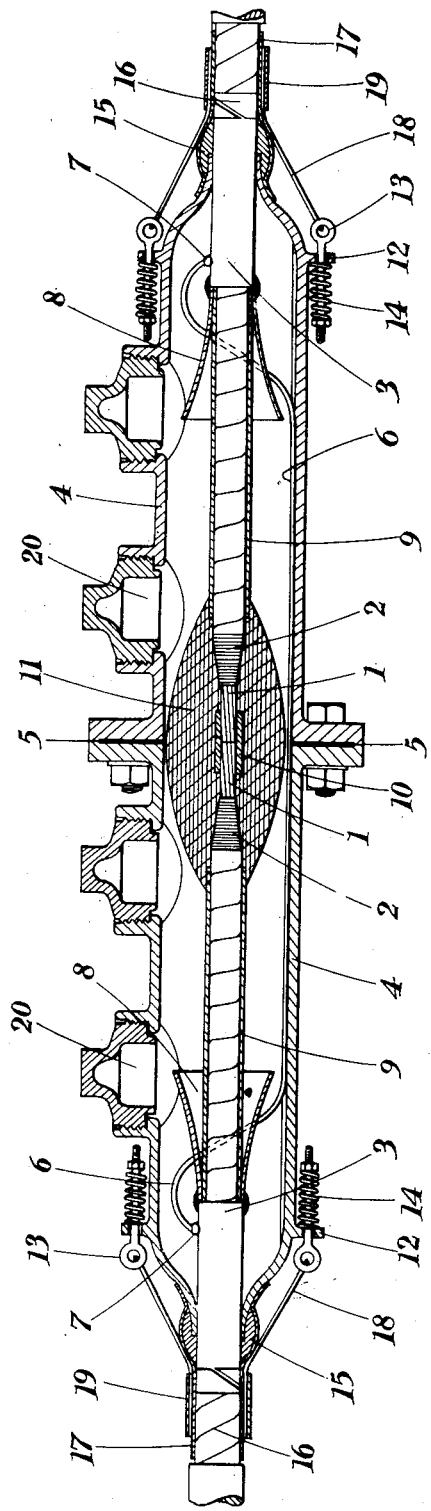

JOINTS FOR ELECTRIC CABLES

Charles James Beaver and Edward Leslie Davey, Cheshire, England, assignors to W. T. Glover and Company Limited, Trafford Park, Manchester, England, a British company Application July 6, 1935, Serial No. 30,060
In Great Britain July 18, 1934

7 Claims. (Cl. 173—268)

This invention is concerned with the making of joints in electric cables which work with pressure fluid forming part of the dielectric inside the sheath. It deals particularly with cases where there is freedom of movement of the pressure fluid along the length of the cable, and also particularly with the case where the pressure fluid is a gas. The joint of the conductor and dielectric may, for instance, consist of a joint between the conductor ends made by a ferrule, the dielectric being pencilled down at each side of the bared ends of the conductor and the whole of this bared and pencilled part and the adjacent ends of the complete dielectric being wrapped with appropriate material up to the required size. Such a joint will be enclosed in a joint box which will be filled with compound.

It is an object of the present invention to provide an improved joint in which pressure fluid can be made to pass through the dielectric of the cable ends and into the wrapping of the joint. With this object in view, each bared end of the dielectric of the cable length is enclosed in a closely fitting tube of rigid insulating material, such as bakelized paper, which is jointed to the sheath and extends up to the wrapping of the actual joint and is enclosed at the end in that wrapping.

With such an arrangement, the fluid pressure can be established through the cable dielectric right up to the joint and the fluid can also percolate into the interstices of the wrapping of the joint. During the establishment of the pressure within the dielectric, the tube performs the important function of reinforcing the bared end of the dielectric. As the pressure fluid is forced in, it travels along the dielectric from the end of the sheath to the center of the joint and, in the absence of the reinforcement, there might be a tendency to burst the dielectric at some point owing to local pressure differences which exist temporarily while the pressure fluid is proceeding through the dielectric.

Since the joints can only be filled with pressure fluid after the cable has been laid, it will be seen that the filling must take place from one or both ends of the cable so that the pressure fluid has to travel a considerable distance. It is a further object of the invention to provide for the rapid filling of the joints and associated cable lengths with pressure fluid. To this end, there is adapted to the joint arrangement described, the known device of a bypass pipe. By this expedient, the two sides of the joint are put at equal high pressures simultaneously when the pressure fluid reaches the joint, and the pressure fluid works inward into the joint insulation from both ends. This has the advantage of providing a shorter path for the pressure fluid through the interstices of the insulation and the full pressure difference on each half of the joint, thus greatly cutting down the time for filling the joint with the fluid.

The arrangement also prevents the joint from serving as a high resistance barrier to the flow of pressure fluid, both during the initial filling of the cable with that fluid and during any flow that may be required to take place in the later life of the cable.

With such pressure-fluid-filled cables, it is necessary to provide reinforcement on the outside of the lead sheath to enable the latter to support the internal pressure. Such reinforcement is lapped on the outside of the sheath and is usually in the form of tape applied helically with a comparatively short lay and commonly in two layers. Any tendency of the sheath, expanding under internal pressure, to produce an increase in diameter of the helix of the reinforcement is accompanied by a tendency for the helix of the reinforcement to contract longitudinally. Conversely, a longitudinal pull on the reinforcing members produces a tendency to diametral contraction. It will be seen, therefore, that as the pressure fluid travels along the cable, it tends to produce a disturbance of the reinforcement, one effect of which is a longitudinal contraction thereof. It is a further object of the present invention to secure the reinforcement to the joint box, in such a way as to maintain continuity of the effect of the reinforcement over the whole of the sheath, in spite of the action of disturbing influences due to the movement of pressure fluid and to temperature changes or other influences during the working of the cable. With this end in view, the helical reinforcement is bound to tension members at the point where the cable enters the joint box and these tension members are anchored through spring connections to the box itself. This insures that a longitudinal pull is always exerted on the reinforcement by springs, the movement of which permits small disturbance of the reinforcement to take place without permitting the reinforcement to cease from pressing upon the sheath throughout the length of cable.

The following example of a joint will serve to illustrate the invention. It is shown in the accompanying drawing in longitudinal section.

The cable ends are prepared by baring the conductors for a short distance at 1, pencilling down the dielectric material at 2, and stripping back the sheath for a considerable length beyond the pencilled down part of the dielectric to 3. The joint box 4 is formed of two similar halves meeting in a vertical plane 5 which, in the finished joint, passes through the centre of the joint. These two halves are slipped over the cable ends and pushed along clear of the parts which are to be operated upon. Near the end of each of the lead sheaths is made a small hole into which is inserted the end of a pipe 6 of comparatively small bore made, for instance, of lead and these ends are joined to the lead sheath by wiped joints at 7. The pipe 6 is of greater length than the joint so that it can lie along the wall of the joint box when this is in position, a groove being provided to receive it.

To the end of each sheath at 3 is joined by a wiped joint a hollow conical body 8 of lead which serves as a stress cone. Into this cone is inserted a tube 9 of bakelized paper which fits closely on the dielectric and is sealed in position in the cone 8 by hard compound or other similar sealing material. This tube extends over the bare dielectric to the point where it is pencilled down at 2. The two ends of cable are now ready for jointing, which is carried out by connecting the two conductor ends by a ferrule 10 and then wrapping on a silk or varnished cambric or other tape so as to build up a body 11 of a diameter slightly less than that of the interior of the box 4 and tapering off from the centre towards each side and overlapping the end of each of the two bakelized paper tubes 9. When this is complete, the two halves of the box 4 are brought into position and joined together.

On the outer part of each half of the box 4 are mounted four lugs 12 in each of which is an eye-bolt 13 loaded with a spring 14. Each end of the box 4 is connected with the sheath by a wiper joint 15. Just behind this joint, the reinforcing tape 16 is bound down with wire 17 and over this binding the ends of four stout wire U-pieces 18 are placed and over them a further layer of binding wire 19. The bindings 17 and 19 are made secure by soldering. Before being placed in position, each U-piece 18 is passed through the eye of one of the bolts 13, which are slackened off or removed from their lugs 12 for the purpose. When the securing of the U-pieces 18 is complete, the eye-bolts 13 are tightened up so as to apply tension to the springs 14 with which they are loaded and exert a pull on the reinforcement 16. By this means, the reinforcement 16 is permanently connected to the box 4 in a manner which permits of slight creeping taking place without great change of tension. The effectiveness of the reinforcement is thus preserved.

The box 4 is provided with filling holes 20 so that it can be completely filled with appropriate compound as the final operation of making the joint.

The tubes 9 surrounding the bared ends of the dielectric material prevent the box filling compound from mixing with the cable impregnating compound.

What we claim as our invention is:—

1. For an electric cable working with gas under pressure within pervious solid insulating material enclosed in a sheath, a jointing arrangement comprising the end parts of two cable lengths, said parts each having a bared end of insulating material extending beyond the end of the sheath, means for connecting the conductors of said end parts, a tube of rigid insulating material closely fitting on each of said bared ends and jointed to the sheath at one end, and a body of insulating tape wrapped round the conductor connection and round the adjacent ends of said tubes and built up to a diameter substantially greater than that of the said tubes whereby gas under pressure can percolate the end parts of the insulation of the cables and into the said built up body and fill the interstices thereof.

2. For an electric cable working with gas under pressure within pervious solid insulating material enclosed in a sheath, a jointing arrangement comprising the end parts of two cable lengths, said parts each having a bared end of insulating material extending beyond the end of the sheath, means for connecting the conductors of said end parts, a tube of rigid insulating material closely fitting on each of said bared ends and jointed to the sheath at one end, a body of insulating tape wrapped round the conductor connection and round the adjacent ends of said tubes and built up to a diameter substantially greater than that of the said tubes whereby gas under pressure can percolate the end parts of the insulation of the cables and into the said built up body and fill the interstices thereof and a pipe connected wtih the sheaths of the two cable ends, by-passing said bared ends and built up body and facilitating the feeding of gas thereinto.

3. For an electric cable working with gas under pressure within pervious solid insulating material enclosed in a sheath, a jointing arrangement comprising the end parts of two cable lengths, said parts each having a bared end of insulating material extending beyond the end of the sheath, enclosing means on said bared ends, means for connecting the conductors of said end parts, a body of insulating tape wrapped round the conductor connection and round the adjacent ends of said enclosing means and built up to a diameter substantially greater than the said bared ends, which it overlaps and through which it receives gas under pressure, and a pipe connected with the sheaths of the two cable ends, by-passing said bared ends and built up body and facilitating the feeding of gas thereinto.

4. In a cable joint of the class described for cables having a sheath and reinforcement thereon, a pair of box sections forming a chamber round the joint, said sections being secured to the sheaths of the cables by a fluid tight joint and being connected with the reinforcement through resilient couplings.

5. The combination with cable ends to be coupled wherein the cable comprises a conductor with a lead sheath and in which there is an extensible reenforcement about the sheath, of means rigidly connecting the sheaths with one another to prevent relative endwise movement and means resiliently connecting the reenforcements.

6. The combination with cable ends to be coupled wherein the cable comprises a conductor with a lead sheath and in which there is an extensible reenforcement about the sheath, of means comprising a rigid joint box connecting the two sheaths, and longitudinally resilient elements connecting the joint box and the reenforcements to yieldably exert tension between the joint box and the reenforcements.

7. The combination with cable ends to be coupled wherein the cable comprises a conductor with a lead sheath and in which there is an extensible reenforcement about the sheath, and wherein fluid under pressure is circulated through the cables, of means rigidly connecting the sheaths with one another to prevent relative endwise movement, means resiliently connecting the reenforcements, and means for establishing a fluid passage from one cable to the other.

CHARLES JAMES BEAVER.
EDWARD LESLIE DAVEY.